(12) United States Patent
Lehnhoff (10) Patent No.: US 11,548,274 B2
(45) Date of Patent: Jan. 10, 2023

(54) METHOD FOR THE ONLINE QUALITY CONTROL OF DECORATIVE PRINTS ON SUBSTRATE MATERIALS

(71) Applicant: Flooring Technologies Ltd., Kalkara (MT)

(72) Inventor: Ingo Lehnhoff, Dierhagen (DE)

(73) Assignee: Flooring Technologies Ltd., Kalkara (MT)

( * ) Notice: Subject to any disclaimer, the term of this patent is extended or adjusted under 35 U.S.C. 154(b) by 19 days.

(21) Appl. No.: 16/972,140

(22) PCT Filed: Jun. 6, 2019

(86) PCT No.: PCT/EP2019/064777
§ 371 (c)(1),
(2) Date: Dec. 4, 2020

(87) PCT Pub. No.: WO2019/234147
PCT Pub. Date: Dec. 12, 2019

(65) Prior Publication Data
US 2021/0245493 A1 Aug. 12, 2021

(30) Foreign Application Priority Data
Jun. 6, 2018 (EP) .................. 18176271

(51) Int. Cl.
*G06T 3/40* (2006.01)
*H04N 5/345* (2011.01)
(Continued)

(52) U.S. Cl.
CPC .......... *B41F 33/0036* (2013.01); *G01J 3/463* (2013.01); *G06T 3/4023* (2013.01); *H04N 5/345* (2013.01);
(Continued)

(58) Field of Classification Search
CPC .............. H04N 1/2154; H04N 1/2112; H04N 2101/00; H04N 5/2628; H04N 5/247;
(Continued)

(56) References Cited

U.S. PATENT DOCUMENTS 3,274,927 A * 9/1966 Lusher .................... B41F 17/22
101/40
5,322,578 A * 6/1994 Ogle ....................... B29C 63/04
156/64
(Continued)

FOREIGN PATENT DOCUMENTS

AT 504213 A4 4/2008
AT 505556 A4 2/2009
(Continued)

OTHER PUBLICATIONS

Wueller, An ISO standard for measuring low light performance, Feb. 27, 2015 [retrieved Jun. 16, 2021], Proc. SPIE : Digital Photography XI, vol. 9404, 13 pages. Retrieved: https://doi.org/10.1117/12.2079936 (Year: 2015).*
(Continued)

*Primary Examiner* — Matthew C Bella
*Assistant Examiner* — Dennis Rosario
(74) *Attorney, Agent, or Firm* — The Webb Law Firm (57) ABSTRACT

The invention relates to a method for online quality control of decorative prints on substrate materials, including similarity comparisons of actual and target images and adjusting decorative prints if deviations of color values are detected. The method may include the steps of: a) producing a hyperspectral digital image of a print decoration; b) calibrating the print decoration via a hyperspectral digital image; c) producing and storing a digital target image of the print decoration; d) creating a first print decoration on a first substrate material; e) producing and storing a digital actual
(Continued)

image of the printed decoration on the first substrate material; f) determining color deviations between the digital target image and the digital actual image via a computer program; and g) printing on at least one side of substrate materials so as to form a decorative layer. The invention also relates to a device for carrying out the method.

15 Claims, 2 Drawing Sheets

(51) Int. Cl.
*B41F 33/00* (2006.01)
*G01J 3/46* (2006.01)
*G01J 3/28* (2006.01)

(52) U.S. Cl.
CPC .............. *G01J 2003/2826* (2013.01); *G06T 2207/10036* (2013.01); *G06T 2207/20216* (2013.01)

(58) Field of Classification Search
CPC ............ H04N 5/23229; H04N 5/2253; H04N 5/23232; H04N 5/23235; H04N 5/343; H04N 5/345; H04N 5/3452; H04N 5/3454; H04N 5/3456; H04N 5/347; H04N 19/587; H04N 19/59; H04N 3/1562; H04N 2201/0065; H04N 2201/325; G02B 2027/0138; G06T 3/4053; G06T 2207/30124; G06T 5/30; G06T 5/50; G06T 2207/20016; G06T 2207/30108; G06T 3/40; G06T 3/4023; G06T 5/007; G06T 1/00; G06T 2207/20208; G06T 2207/20216; G06T 2207/20212; G06T 3/4092; G06T 2207/30144; G06T 2207/30161; G06T 2207/30164; G06T 2207/10036; G09G 5/391; G09G 2340/0407; G09G 2340/04; G09G 2340/0457; G09G 2340/045
See application file for complete search history.

(56) References Cited

U.S. PATENT DOCUMENTS

| | | |
|---|---|---|
| 8,531,667 B2 | 9/2013 | Horita |
| 10,029,452 B2 | 7/2018 | Lehnhoff |
| 10,315,410 B2 | 6/2019 | Lehnhoff |
| 2007/0018906 A1* | 1/2007 | Visnovsky ................ G01J 3/46 345/1.1 |
| 2008/0247628 A1* | 10/2008 | Ramsing ................ C12M 41/48 382/133 |
| 2009/0215477 A1* | 8/2009 | Lee ........................ H04W 12/06 455/466 |
| 2011/0206242 A1 | 8/2011 | Massen et al. |
| 2018/0024076 A1 | 1/2018 | Efner et al. |
| 2018/0095307 A1* | 4/2018 | Herloski ................. G02F 1/137 |
| 2018/0201011 A1* | 7/2018 | Efner ................. H04N 1/00047 |
| 2018/0357793 A1 | 12/2018 | Boes et al. |
| 2020/0117940 A1* | 4/2020 | Wang ..................... G06K 9/036 |
| 2021/0272320 A1* | 9/2021 | Boes ....................... G01J 3/465 |

FOREIGN PATENT DOCUMENTS

| | | |
|---|---|---|
| DE | 19908296 A1 | 8/2000 |
| DE | 102013104208 B3 | 10/2014 |
| EP | 2777942 A1 | 9/2014 |
| JP | 201175304 A | 4/2011 |
| JP | 2011527017 A | 10/2011 |
| WO | 03047865 A1 | 6/2003 |
| WO | 2008034156 A1 | 3/2008 |
| WO | 2008080185 A2 | 7/2008 |

OTHER PUBLICATIONS

Kang et al., Decolorization-Based Hyperspectral Image Visualization, Apr. 11, 2018 (first instance of public dissemination) (retrieved Jun. 1, 2022), IEEE Transactions on Geoscience and Remote Sensing, vol. 56, Issue: 8 pp. 4346-4360. Retrieved: https://ieeexplore.ieee.org/abstract/document/8335335 (Year: 2018).*

* cited by examiner

FIG 1
Prior Art

METHOD FOR THE ONLINE QUALITY CONTROL OF DECORATIVE PRINTS ON SUBSTRATE MATERIALS

CROSS-REFERENCE TO RELATED APPLICATIONS

This application is the United States national phase of International Application No. PCT/EP2019/064777 filed Jun. 6, 2019, and claims priority to European Patent Application No. 18176271.7 filed Jun. 6, 2018, the disclosures of which are hereby incorporated by reference in their entirety.

BACKGROUND OF THE INVENTION

Field of the Invention

The invention provides a method and an apparatus for the online quality control of decorative prints on substrate materials, comprising the similarity comparison of a digital actual image and a digital target image of the print decorations and the adaptation of the decorative print if deviations of the color values of the digital actual image from the color values of the digital target image are ascertained during the production of a batch of substrate materials with a decorative print.

Description of Related Art

Color is an essential feature of a print decoration that is produced by various techniques, such as e.g. intaglio printing or digital printing. In each of these techniques, the desired appearance of the print is achieved by superimposition of different pigment layers of the primary colors. The intaglio printing method is a printing technique in which the elements to be imaged are present as depressions in a printing plate of a printing roller, for example, which is inked before printing. The printing ink is situated primarily in the depressions and is transferred to the object to be printed on account of contact pressure of the printing plate and adhesion forces. In digital printing, by contrast, the print image is transferred directly from a computer into a digital printer such as e.g. a laser printer or inkjet printer, the use of static printing plates being obviated. The primary colors cyan, magenta, yellow and black (CYMK) are usually used in digital printing. The CMYK color model is a subtractive color model, the abbreviation CMYK standing for the three color components Cyan, Magenta, Yellow and the black component Key as color depth. This color system can be used to image a color space (gamut) that satisfies many requirements from a wide variety of areas.

An open problem that represents a central theme in all areas of color-based or color-processing industry is that of achieving a high degree of color fidelity, in other words the ability to reproduce predefined colors with minimal chromatic difference with respect to an original, specifically in particular on different substrate materials as well. One essential step for this purpose is the analysis of the color composition of a predefined original. Color differences determined can then be used to adapt the color composition during the printing of a decoration onto a substrate material or of a batch of a substrate material with a decoration, such that desired quality requirements are achieved. One quality requirement consists, inter alia, in color deviations between a digital target image and a digital actual image of the printed decoration occurring only below a predefined target value.

Suitable substrate materials are, for example, paper, glass, metal, films, wood-based boards, in particular MDF or HDF boards, WPC boards, veneers, lacquer layers, plastic boards and inorganic substrate boards. Wood-based boards are preferred according to the invention.

Wood-based boards provided with a decoration are often used for producing flooring laminate or in the form of wall and ceiling lining elements. There are a number of approaches for decorating wood-based boards. In this regard, coating wood-based boards with a decorative paper has often been used in the past, with no limits imposed on the diversity of differently patterned decorative papers. As an alternative to the use of decorative papers on wood-based boards, the possibility of direct printing on wood-based boards has been development, which obviates printing on paper and the subsequent lamination or direct coating thereof onto the wood-based boards. The printing techniques principally used in this context are the intaglio printing and digital printing methods already mentioned above.

Digital printing makes it possible to produce a printed image with particularly high quality as a result of a higher resolution and furthermore allows a broader range of applications in conjunction with high flexibility. The disadvantage of increased costs of digital printing technology per print, particularly in comparison with conventional printing methods such as the intaglio printing method, recedes into the background here. Despite the diverse advantages of digital printing, problems occur particularly if a combination with other printing methods is desired or necessary. Such a combination of digital printing with other printing methods such as the intaglio printing method may occur, for example, if a customer is presented with a decoration which was created using digital printing with a correspondingly high resolution and only an engraved decoration printing roller with a lower resolution is used for this decoration in the course of possibly subsequent mass production of printed wood-based boards, with the result that the two prints (i.e. the print of the pattern presented and the print of the mass-produced products) exhibit distinct differences in a visual comparison.

A further open problem thus consists in achieving a high degree of color fidelity, i.e. in the ability to reproduce predefined colors with minimal chromatic difference with respect to an original, specifically in particular with the use of different printing techniques as well.

In order to solve the problems of the prior art, it is necessary to carry out online quality controls during the printing processes and, if appropriate, to make corrections during the implementation of the decorative print. A prerequisite for online quality controls and the adaptation of the decorative print during the implementation thereof is the presence of target values of the decoration, on the basis of which it is possible to carry out a similarity comparison with the actual values of the decoration that are printed during current production, in order to be able to ascertain possible deviations of the actual values from the target values of a decoration. By way of example, the color values of the decorations can be used for such a similarity comparison.

Methods for the color analysis of an image and for carrying out a similarity comparison between two objects, such as two images, for instance, are known in the prior art and are described for example in AT 505556 A4, WO 2008034156 A1 and WO 2008080185 A2.

AT 505556 A4 relates to a method for analyzing an image created with a number of primary colors on a predefined substrate, characterized in that a) the reflectance is determined or measured for a predefined number of image regions of the image for a predefined number of defined different spectral ranges of light wavelengths, b) the measured reflectances are entered into a reflectance matrix (R), c) for determining the reflectance spectra of the mixed colors it is assumed that the reflectance of a mixed color composed of primary colors is formed by means of an, in particular linear, predefined model, d) the equation R=f(C, S), in particular the linear equation $R=C*S^T$, is used, wherein C is a color distribution matrix to be determined, and e) the color distribution matrix (C) and the spectral matrix (S) are determined for a given reflectance matrix (R) by means of an optimization method.

WO 2008034156 A1 relates to a method for the similarity comparison of objects or of digital object images recorded from two objects, using statistical methods. According to the invention, it is provided that identical or congruent image regions are selected from the two object images or the two object images represent identical or congruent image regions, that the statistical distribution of the intensities of the individual pixels and/or of predefined pixel regions is determined for each of these two identical or congruent image regions using the same function, that the similarity of the statistical distributions of the intensities obtained for the two identical or congruent image regions is checked using statistical methods, in particular using a similarity function, and that the extent of the similarity of the two statistical distributions of the intensities is used as a measure of the similarity of the two object images.

WO 2008080185 A2 relates to a method for the similarity comparison of two objects, wherein digital object images recorded from the two objects, in particular an actual image and a target image, are compared, wherein for the comparison identical or congruent regions are selected from the two object images or the two object images represent identical or congruent image regions, characterized in that each object image made available or used from the two objects, in particular the actual image and the target image, comprises an image set of at least two images, preferably of a multiplicity of images, and in that for each of the two image sets the intensity values, in particular grayscale values or color values, for each pixel of the image region of the individual images are represented in the form of a vector pair. These features make it possible to obtain numerical values which can be arranged if necessary in the form of a vector, wherein said numerical values or the length of the vector can be used as a measure of the similarity of the two object images.

The methods disclosed in AT 505556 A4, WO 2008034156 A1 and WO 2008080185 A2 use hyperspectral images as a basis of the similarity comparison or the color analysis of an image. "Hyperspectral sensor system" is understood to mean a sensor system which can record images of very many, closely adjacent wavelengths. The eye sees the environment multispectrally in the wavelengths of the primary colors red, green and blue. Hyperspectral systems record data of 20 to 250 different channels extending from wavelengths in the ultraviolet range to the long-wave infrared range. The advantage of hyperspectral systems is that images with a very high detail accuracy and resolution are recorded and stored. What proves to have a disadvantageous effect, however, is that there is a high computational complexity for generating hyperspectral images and a large amount of storage space is required for storing hyperspectral images. The time duration when generating hyperspectral images is lengthened, moreover, on account of the high computational complexity. By contrast, an online quality control of decorative prints on substrate materials is intended to be effected very rapidly and without delays in the production process. The procurement of multiple or numerous hyperspectral scanners for the in-process control of decorative prints would additionally be very expensive and unprofitable. The use of hyperspectral images is thus unsuitable for the online quality control of decorative prints on substrate materials.

SUMMARY OF THE INVENTION

The object of the invention therefore consists in providing a method for the online quality control of decorative prints on substrate materials which is simple, very rapid and profitable and thus enables the disadvantages of the prior art to be overcome.

The object of the invention is achieved by means of a method for the online quality control of decorative prints on substrate materials and an apparatus.

In particular, the invention provides a method for the online quality control of decorative prints on substrate materials, comprising the similarity comparison of a digital actual image and a digital target image of the print decorations and the adaptation of the decorative print if deviations of the color values of the digital actual image from the color values of the digital target image are ascertained during the production of a batch of substrate materials with a decorative layer, wherein a) at least one hyperspectral digital image of a print decoration is generated;
b) the print decoration is calibrated by means of the at least one hyperspectral digital image;

characterized in that the method furthermore comprises the following steps:

c) generating and storing a digital target image of the print decoration with a resolution in the range of 4 to 36 megapixels, in particular in the form of a digital photograph;
d) creating at least one first print decoration on at least one first substrate material;
e) generating and storing at least one digital actual image of the printed decoration on the at least one first substrate material with a resolution in the range of 4 to 36 megapixels, in particular in the form of a digital photograph;
f) determining color deviations between the digital target image and the digital actual image by means of a computer program;
g) printing on at least one side of further substrate materials to form a decorative layer in such a way that color deviations between the digital target image and digital actual images of the printed decorations on the further substrate materials occur only below a predefined target value or only within a predefined tolerance range.

A hyperspectral digital image of a print decoration can be generated by means of a hyperspectral system, such as with a hyperspectral camera, for example, or preferably by means of a hyperspectral scanner. The prior art discloses a corresponding method for generating hyperspectral images as ACMS® (Advanced Colour Measurement System). Hyperspectral systems have a multiplicity of detectors. A hyperspectral data cube having two spatial dimensions and one spectral dimension arises as a result of the recording. Four fundamental techniques are available for generating said hyperspectral data cube. By means of a so-called snapshot, the entire data set is supplied by a single detector output. In the case of spatial scanning, each detector output supplies the spectrum of a narrow strip of the original. In the case of spectral scanning, each detector output supplies a monochromatic, spatial map of the original. In the case of spatial-spectral scanning, each detector output supplies a spectrally encoded, spatial map of the original. Regardless of which method is used when generating the hyperspectral image according to the invention, the summary above makes it clear that enormous amounts of data are generated in the course of generating a hyperspectral data cube. This has a disadvantageous effect on the use of these enormous amounts of data in the online quality control of decorative prints on substrate materials. The aim of the invention, therefore, is to provide an original of the printed decoration which, in the context of the online quality control, can be used to carry out a simple similarity comparison of specific properties, such as, for example, the colors of the decoration printed onto the substrate materials during production.

It has proved to be advantageous if this original used as a basis for the similarity comparison in the context of the online quality control of printed decorations on substrate materials is formed from a plurality of originals and is normalized by calibration in accordance with step b) of the method according to the invention. Calibration in the sense of the invention means that from at least one hyperspectral digital image, preferably a plurality of hyperspectral digital images, more preferably 2, 3, 4 or 5, particularly preferably 3, hyperspectral digital images of one or a plurality of originals of the print decoration, by means of a similarity comparison, a kind of hyperspectral digital "average image", for example with average color values, is generated or average numerical color values are determined, which can be provided as a so-called "similarity index". The calibration in accordance with step b) of the method according to the invention can be carried out for example by means of a similarity comparison of two images as described in WO 2008034156 A1. Accordingly, the similarity comparison of hyperspectral digital images is characterized in that hyperspectral images of the print decoration are present or are provided in the form of an image set with a number of respectively corresponding images, identical or congruent image regions are selected from the images of the image sets or said images represent identical or congruent image regions, the statistical distribution of the intensities of the individual pixels and/or of predefined pixel regions is determined for each image region of said image sets by means of a computer program, the similarity of the statistical distributions of the intensities obtained in each case for identical or congruent image regions of corresponding images of the image sets is checked using statistical methods, in particular using a similarity function, the extent of the similarity of these two statistical distributions of the intensities is used as a measure of the similarity of the two corresponding images and/or as a measure of the similarity of the two images; and target values are defined for the color values of the print decoration.

Further details of this method for similarity comparison are described in WO 2008034156 A1 and known to the person skilled in the art.

Alternatively, the calibration in accordance with step b) of the method according to the invention can be effected by means of a similarity comparison of the hyperspectral digital original images as described in WO 2008080185 A2. Accordingly, the similarity comparison of the hyperspectral digital images in accordance with step b) of the method according to the invention comprises the similarity comparison of two hyperspectral digital images of the print decoration, in particular of an actual image and a target image, wherein for the comparison identical or congruent regions are selected from the two hyperspectral digital images or the two hyperspectral digital images represent identical or congruent image regions, characterized in that each of the two hyperspectral digital images, in particular the actual image and the target image, comprises an image set of at least two images, preferably of a multiplicity of images (1, 2, 3 . . . ; 1', 2', 3', . . . ), for each of the two image sets the intensity values, in particular grayscale values or color values, for each pixel of the image region of the individual images (1, 2, 3 . . . ; 1', 2', 3', . . . ) are represented in the form of a vector (v, v'), a value pair (L, L') consisting of the lengths L and L' of the vectors v and v' is determined from each vector pair (v, v') of corresponding pixels ($x_i$, $y_i$, $x_i'$, $y_i'$) and these values are plotted in relation to one another in a diagram or said value pairs are represented as points in a diagram or as a point cloud, for each vector pair (v, v') the difference angle ($\theta$) of the vector v and the difference angle ($\theta'$) of the vector v' are determined in each case relative to a reference vector ($v_{ref}$), a value pair ($\theta$, $\theta'$) is formed from these angles $\theta$ and $\theta'$ and these values are plotted in relation to one another in a diagram or these value pairs are represented as a point cloud in a diagram, a characteristic straight line is placed through each of the two point clouds or the points respectively contained in each of the two point clouds are fitted or approximated with a straight line, and in that the gradients and the abscissa portions of the two straight lines obtained, in particular in the form of a vector formed thereby, are used or regarded as a measure for assessing the similarity of the two images.

In one preferred embodiment, the method for similarity comparison according to WO 2008080185 A2 is characterized in that the vector formed by the two gradients ($k_1$, $k_2$) and the two abscissa portions ($d_1$, $d_2$) is normalized or standardized using standard methods or the length of the normalized vector is determined and the figure obtained is regarded as a measure of the similarity of the images to be compared, in particular of the actual image and the target image. Further details of this method for similarity comparison are described in WO 2008080185 A2 and known to the person skilled in the art.

As a result of the calibration step b) of the method according to the invention, an average hyperspectral digital image, i.e. the digital target image of the print decoration, is obtained, which is based on a very extensive data set and the display of which, for example on a monitor, requires a high computing power and high storage capacity of the data processing system used to carry out the method according to the invention. Alternatively, after the calibration, average color values of the decoration are provided as target values in the form of a similarity index, which values could be used to carry out a similarity comparison with color values of actual images of the decoration. However, both alternatives are based on the fact that the actual images of the decorations would likewise have to be present as hyperspectral images, in order to ensure comparability with the target image or target images of the similarity index. For these reasons, inter alia, it is technically disadvantageous to use this digital hyperspectral target image or numerical target values of the print decoration that are generated therefrom directly for the online quality control during the process for producing substrate materials printed with decorations.

In a further embodiment, the method according to the invention is therefore characterized in that a digital target image is generated in method step c) by converting a calibrated hyperspectral image into an image file with a resolution in the range of 4 to 36 megapixels, preferably 4 to 24 megapixels, particularly preferably in the range of 4 to 12 megapixels. The conversion of a calibrated hyperspectral image into an image file with lower resolution can be effected for example by means of a computer program or by printing on a substrate material with the print decoration on the basis of the digital target image and subsequent scanning by means of a color scanner or photographing of the printed decoration by means of a digital camera. Method step c) provides an image file of reduced resolution, and thus with a reduced storage space requirement and significantly lower computing power for the display of the corresponding image. As a result, said image file or the digital image with a resolution in the range of 4 to 36 megapixels is particularly suitable for use in online quality control during the process for producing substrate materials printed with decorations.

The method according to the invention subsequently comprises the following step:

d) creating at least one first print decoration on at least one first substrate material.

The print decoration can be produced on a substrate material both by means of the intaglio printing method and by means of digital printing. The method according to the invention for the online quality control of decorative prints on substrate materials is equally suitable for print decorations that have been produced by means of the intaglio printing method or by means of digital printing.

From this print decoration produced by means of the intaglio printing method or by means of digital printing on the substrate material, according to the invention step e) then involves generating and storing at least one digital actual image, preferably a multiplicity of digital actual images, of the printed decoration on the at least one first substrate material with a resolution in the range of 4 to 36 megapixels, preferably 4 to 24 megapixels, particularly preferably in the range of 4 to 12 megapixels. In one particularly preferred embodiment, the resolution of the digital actual image always corresponds exactly to the resolution of the digital target image in order to ensure the comparability of target image and actual image. The digital actual images can be generated by any conventional digitizing means, such as, for example, a color scanner or a digital camera. It is preferred if the digital actual image is generated and stored in the form of a digital photograph.

In one preferred embodiment of the invention, the process of generating the digital photographs in accordance with method steps c) and e) is effected under equivalent conditions, in particular with the exclusion of varying external light influences and with an identical resolution in the range of 4 to 36 megapixels, preferably 4 to 24 megapixels, particularly preferably in the range of 4 to 12 megapixels. It is also expedient to use the same digitizing means when generating the digital target image and the digital actual images. This makes it possible to ensure that in the course of subsequently determining color deviations between the digital target image and the digital actual image by means of a computer program in method step f), the color deviations are not attributable to external influences, but rather can be attributed to variations of properties of the substrate material, such as, for example, colorfulness, wettability with the printing inks or the like, or to fluctuations when implementing the decorative print, such as, for example, variations of the printing inks, in particular during a batch change, or fluctuations in the applied quantity of the printing inks. These are parameters which can be controlled and subsequently regulated during the production process.

If color deviations between the digital target image and the digital actual image are ascertained in method step f), then in accordance with method step g) these data are used for printing control, i.e. to carry out the printing on at least one side of further substrate materials to form a decorative layer in such a way that color deviations between the digital target image and digital actual images of the printed decorations on the further substrate materials occur only below a predefined target value. The target value for possible color deviations can be defined individually depending on the requirements and is defined, in particular, such that the production of rejects can be minimized or avoided. It is particularly preferred if an automatic adaptation of one or more color values of the L*a*b* color space and/or of the L*C*h° color space is carried out during the production of the print decoration on the substrate materials, in such a way that color deviations between the digital target image and digital actual images of the printed decorations on further substrate materials occur only below a predefined target value.

Alternatively, instead of the automatic printing control, a warning signal can be output to the operating personnel of a printing line for substrate materials, thereby enabling the operating personnel to intervene manually in the printing process and manually to adapt one or more color values of the L*a*b* color space and/or of the L*C*h° color space during the production of the print decoration on the substrate materials or, if appropriate in the case of color deviations that are outside a predefined tolerance range, to stop the production process. The warning signal can be effected either acoustically as warning sound or visually in the form of a colored warning luminaire, warning lamp or display on the monitor of a process computer or a data processing system that controls the printing of the decorations onto the substrate materials.

The method according to the invention is particularly advantageous if digital actual images are generated continuously during the production of a batch of substrate materials with formation of a decorative layer, and if method steps f) and g) are repeated continuously. This makes it possible, in a suitable manner, to produce entire batches and also across batches printed decorations on substrate materials whose color impression varies only above a predefined target value or within a predefined tolerance range, the production of rejects being minimized or avoided.

In one preferred embodiment of the method according to the invention, during the color measurement, the L*, a* and b* values are determined in the so-called L*a*b* color space. The L*a*b* color space is a color space that covers the range of perceptible colors. The L*a*b* color space is described by a three-dimensional coordinate system. The L*-axis describes the lightness (luminance) of the color with values of from 0 (black) to 100 (white). The a*-axis describes the green or red component of a color, wherein negative values stand for green and positive values stand for red. The b*-axis describes the blue or yellow component of a color, wherein negative values stand for blue and positive values stand for yellow. The scales of the a*-axis and b*-axis encompass a numerical range of −150 to +100 and −100 to +150.

In the method according to the invention, the value for the lightness L* is decoration-dependent, i.e. is to be determined specifically for each decoration, and can be for example >10, >20, >30, >40, >50, >60, >70, >80 or >90.

In the method according to the invention, the values for a* and/or b*, which are likewise decoration-dependent, lie for example in a range of between −100 and +100, −80 and +80, −60 and +60, −40 and +40 or −20 and +20. Preferably, the values for a* and/or b* lie in a range of between −10 and +10. In one preferred embodiment, the values for a* and/or b* lie in a range of between −5 and +5. In one particularly preferred embodiment of the invention, the values for a* and/or b* are close to zero.

The color measurement of the digital target image and of the digital actual image can be effected by means of a computer program stored on a data processing system for the printing control. The digital target image is preferably stored in the memory of the data processing system. The digital actual images, which are preferably generated continuously, are continuously compared with the digital target image. The color data are subsequently profiled on the basis of the determined color deviations by means of the processing of the L*, a* and b* values determined during the continuous measurement, by means of a computer program. So-called RIP software is preferably used as the computer program.

In an alternative preferred embodiment of the method according to the invention, during the color measurement, the L*, C* and h° values are determined in the so-called L*C*h° color space.

The L*C*h° color space is the L*a*b* color space but where the cylindrical coordinates C* (chroma, relative color saturation, distance from the L-axis) and h° (hue angle, angle of hue in the L*a*b* color circle) are specified instead of the Cartesian coordinates a*, b*. The L*a*b* lightness L* remains unchanged here.

a* and b* are converted into C* and h° according to the following formulae:

$$C_{ab}^* = \sqrt{a^{*2} + b^{*2}}, \quad h_{ab}^\circ = \arctan\left(\frac{b^*}{a^*}\right)$$

Conversely, the polar coordinates can be converted into the Cartesian coordinates:

$$a^* = C_{ab}^* \cdot \cos(h_{ab}^\circ), \quad b^* = C_{ab}^* \cdot \sin(h_{ab}^\circ).$$

RIP (raster imaging process) software is software for calculating color values. In the method according to the invention, the measured color values are converted into the standard color system CYMK for digital printing during the adaptation of the color data by means of the RIP software taking account of the lightness and/or color of the decoration.

Adaptation of the color values for digital printing means that the proportions of the individual constituents of the CYMK standard color system are altered. The proportions of the individual constituents of the CYMK standard color system are preferably altered such that taking account of the determined lightness and/or the determined color deviations between the digital target image and the digital actual image (in each case with a resolution in the range of 4 to 36 megapixels, preferably 4 to 24 megapixels, particularly preferably in the range of 4 to 12 megapixels) no color deviations occur between the printed decorations of the substrate boards in at least one first batch and/or any further batch.

Instead of digital printing, the adaptation of the color values can alternatively be used for intaglio printing with a plurality of printing rollers, preferably 2, 3, 4 or 5, particularly preferably 3, printing rollers. One or else more than one color channel, e.g. two or three color channels, are used for each printing roller. Using the printing rollers provided with the assigned color information, taking account of the determined lightness and/or the determined color deviations between the digital target image and the digital actual image (in each case with a resolution in the range of 4 to 36 megapixels, preferably 4 to 24 megapixels, particularly preferably in the range of 4 to 12 megapixels) a decoration is produced by intaglio printing in such a way that no color deviations occur between the printed decorations of the substrate boards in at least one first batch and/or any further batch.

As printing motifs for digital printing or intaglio printing, various decorations such as e.g. wood decorations, tile decorations, abstract decorations or parquet imitations can typically be used.

Target values or tolerance ranges are predefined for either one or a plurality of color values of the L*C*h° color space and/or of the L*a*b* color space. According to the invention deviations of one or more color values of the L*C*h° color space and/or of the L*a*b* color space of the digital actual images of the printed decorations from the corresponding color values of the digital target image are intended to occur only below a predefined target value of 30%, preferably of 25%, more preferably of 20%, particularly preferably of 15%. Alternatively, deviations of one or more color values of the L*C*h° color space and/or of the L*a*b* color space of the digital actual images of the printed decorations from the corresponding color values of the digital target image are intended to occur only within a predefined tolerance range of ±20%, preferably of ±15%, more preferably of ±10%, particularly preferably of ±5%.

The digital printing for printing on at least one side of a wood-based board can be carried out using a digital printer with a water-based digital printing ink, a UV-based ink or a solvent-based ink. The use of a water-based digital printing ink is preferred. The quantity of digital printing ink used can be between 5 and 15 g/m², preferably 6 and 8 g/m².

In order that color deviations between the printed decorations of a batch or else between identical printed decorations of different batches are kept as small as possible from the outset, it has proved to be expedient if the print decoration created by means of digital printing or the print decoration created by means of intaglio printing using printing rollers are printed onto substrate materials that have previously been uniformly basecoated.

For the production of substrate materials that have previously been uniformly basecoated, in particular of wood-based boards, in one embodiment of the present method, at least one basecoat layer comprising at least one resin and/or at least one lacquer is applied to the side of the wood-based board that is to be printed prior to printing with a decoration, said layer subsequently being incipiently dried and/or incipiently cured.

Preferably, the side of the wood-based board that is to be printed is subjected to incipient grinding before the basecoat is applied.

For basecoating, an aqueous resin solution and/or a radiation-curable filler composition can be applied to the side of the substrate material that is to be printed. Examples of materials that can be used as basecoat compositions are aqueous resin solutions such as melamine-formaldehyde resin, urea-formaldehyde resin or melamine-urea-formaldehyde resin. It is likewise possible to use a single-component/two-component acrylate filler composition, UV filler composition and/or electron beam curing filler composition for precoating or basecoating of the substrate material, and then to subject this basecoat layer to appropriate curing.

Preferably, an aqueous resin solution is used for the precoating or basecoating of the wood-based board, this being an aqueous resin solution that is, in particular, an aqueous solution of a melamine-formaldehyde resin, urea-formaldehyde resin or melamine-urea-formaldehyde resin.

The quantity of liquid resin solution applied for basecoating can be between 10 and 80 g/m², preferably 20 and 50 g/m². The solids content of the aqueous resin solution is between 30 and 80%, preferably 40 and 60%, particularly preferably 55%. The liquid resin can additionally comprise suitable wetting agents, hardeners, release agents and antifoams.

After application of the aqueous resin solution to the wood-based board for the precoating or basecoating thereof, the liquid resin is dried to a moisture content of 10%, preferably 6%, e.g. in a convection oven or near-infrared oven.

In another embodiment of the present method, a single-component/two-component acrylate filler composition and/or electron beam curing filler composition can be used for precoating or basecoating the wood-based board. A UV filler composition advantageously consists substantially of UV-curable lacquer components, pigments, reactive diluents and free-radical generators as chain initiators.

The applied quantity of the filler composition in this case can be from 50 to 150 g/m², preferably from 50 to 100 g/m². The quantitative data here are based on an undiluted filler composition.

It is likewise possible that the filler composition used for basecoating comprises pigment, which can vary or improve the printed result.

Precoating the wood-based board with a transparent basecoat is particularly preferred according to the invention.

In a further embodiment of the present method, before printing on the at least one side of the wood-based board, at least one layer of a pigmented basecoat, which is preferably water-based, is applied to the side of the wood-based board that is to be printed. The pigmented basecoat can be applied either directly to the untreated surface of the wood-based board or else to the previous, preferably transparent, basecoat.

The water-based pigmented basecoat can also be applied in more than one layer (e.g. 3 to 10 layers, preferably 5 to 8 layers, particularly preferably 7 layers), the pigmented basecoat here being dried e.g. in a convection dryer or a near-infrared dryer after application of each layer. The water-based pigmented basecoat preferably contains at least one light-colored pigment, particularly preferably at least one white pigment.

White pigments are achromatic inorganic pigments having a high refractive index (greater than 1.8) which are used primarily to produce a white appearance in paints or as a filler in plastics, for example. White pigments according to the invention can be selected from the group comprising titanium dioxide, lithopone, barium sulfate, zinc oxide, zinc sulfide and calcium sulfate. Lithopone is a white pigment comprising barium sulfate and zinc sulfide. According to the invention, titanium dioxide is preferably used as white pigment in the water-based pigmented basecoat since titanium dioxide has the highest refractive index and thus the highest covering power among known white pigments.

It is likewise possible to apply to the print decoration or print decorations at least one protective layer, preferably two or three layers comprising abrasion-resistant particles, natural fibers, synthetic fibers and/or further additives, wherein resins such as melamine-formaldehyde resin, urea-formaldehyde resin, acrylate resins and polyurethane resins can be used as suitable binders.

The abrasion-resistant particles are preferably selected from the group comprising aluminum oxides, corundum, boron carbides, silicon dioxides, silicon carbides and glass beads. Fibers used as natural and/or synthetic fibers are, in particular, those selected from the group comprising wood fibers, cellulose fibers, wool fibers, hemp fibers and organic or inorganic polymer fibers.

Additives that can be added are conductive substances, flame retardants, luminescent substances and metals. The conductive substances here can be selected from the group comprising carbon black, carbon fibers, metal powders and nanoparticles, in particular carbon nanotubes. It is also possible to use combinations of these substances. Flame retardants preferably used are phosphates, borates, in particular ammonium polyphosphate, tris(tribromoneopentyl) phosphate, zinc borate, or boric acid complexes of polyhydric alcohols. Luminescent substances preferably used are inorganic or organic fluorescent and/or phosphorescent substances, in particular zinc sulfite and alkaline earth metal aluminates.

In a further embodiment of the present method, the substrate material that has been printed and optionally provided with a protective layer, in particular composed of formaldehyde resins, is subjected to further processing or finishing in a short-cycle (SC) press. In the SC press, the resin layers are melted and the layer composite is cured to form a laminate. During further processing in the SC press, using a structured press plate it is also possible to produce surface structures in the surface of the substrate material, such as a wood-based board, which structures can optionally be embodied in a manner coordinated with the decoration (so-called decoration-synchronous structure). In the case of wood decorations, the structures can be present in the form of pore structures which follow the grain. In the case of many decorations, the structures can be depressions in the region of joint filling lines encompassed by the decoration.

The present method is carried out in an apparatus for the online quality control of decorative prints on substrate materials, wherein the apparatus comprises
- at least one means for generating at least one hyperspectral digital image of a print decoration;
- at least one means for calibrating the decoration on the basis of hyperspectral digital images;
- at least one means for generating and storing a digital target image of the print decoration with a resolution in the range of 4 to 36 megapixels, in particular in the form of a digital photograph;
- at least one means for creating at least one first print decoration on at least one first substrate material;
- at least one means for generating and storing at least one digital actual image of the printed decoration on the at least one first substrate material with a resolution in the range of 4 to 36 megapixels, in particular in the form of a digital photograph;
- at least one means for determining color deviations between the digital target image and the digital actual image; and
- at least one means for adapting/controlling the decorative print when printing on at least one side of further substrate materials to form a decorative layer in such a way that color deviations between the digital target image and digital actual images of the printed decorations on the further substrate materials occur only below a predefined target value.

The above-described advantages and advantageous embodiments for the method according to the invention are equally applicable to the apparatus according to the invention, and so reference is made to the statements mentioned above.

As mentioned, the means for generating a hyperspectral digital image of a print decoration is preferably a hyperspectral scanner and/or the means for generating the at least one digital actual image of the printed decoration is preferably a conventional color scanner or a digital camera.

In a further-reaching variant, the apparatus according to the invention comprises at least one means for applying a protective layer to the substrate material provided with the respective print decoration. This means or this apparatus for applying a protective layer is preferably arranged downstream of the printing line.

In one preferred embodiment, the apparatus according to the invention comprises at least one short-cycle press for pressing the substrate material provided with the print decoration and the protective layer arranged thereon.

BRIEF DESCRIPTION OF THE DRAWINGS

The invention is explained in greater detail below on the basis of an exemplary embodiment with reference to the figure, in which.

DETAILED DESCRIPTION OF THE INVENTION

Figure 1:
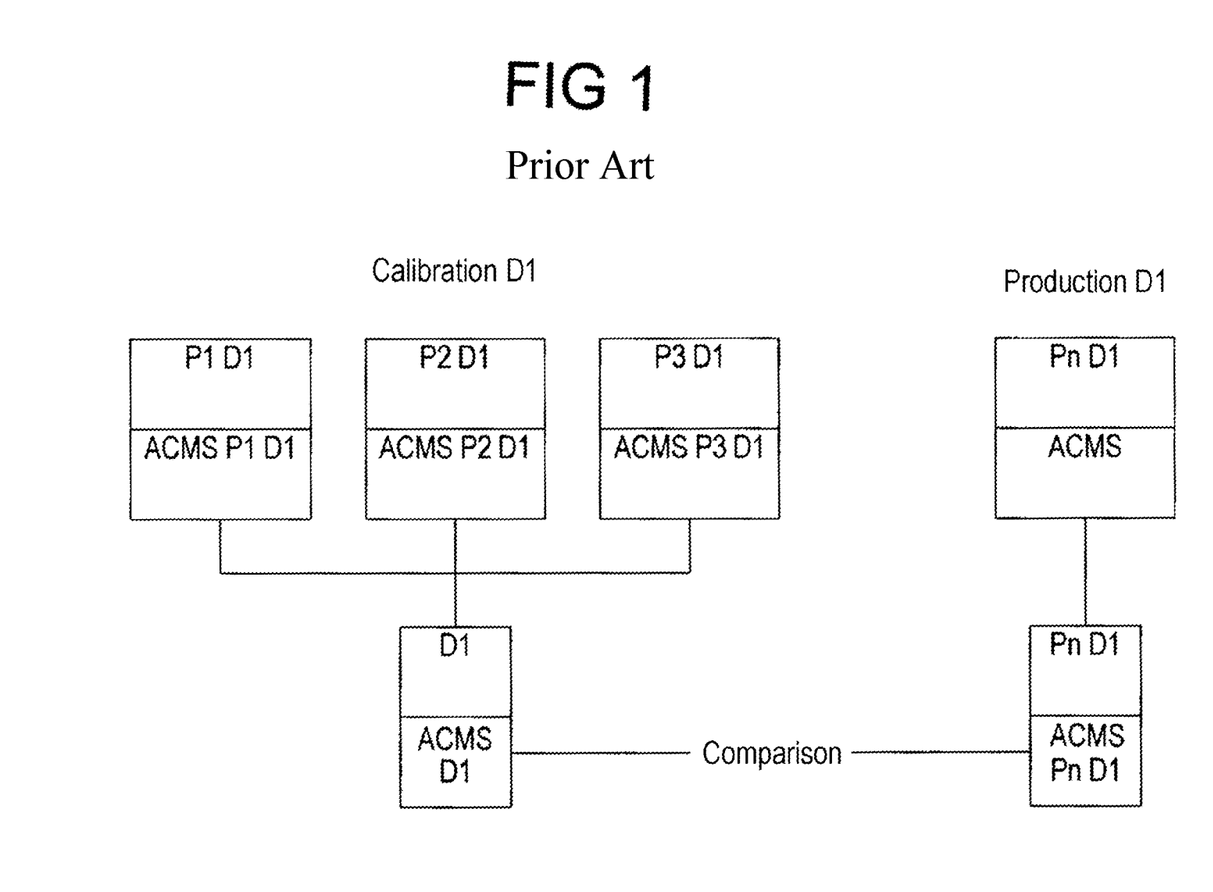
FIG. 1: shows the prior art of the quality control of printed decorations on the basis of hyperspectral scans.

In the prior art, as illustrated in FIG. 1, the calibration of a print decoration (D1), in which images of a plurality of substrate materials which have been printed and thus produced (P1, P2, P3) with the same print decoration (D1), comprises the generation of hyperspectral digital images by means of ACMS® (Advanced Colour Measurement System) (ACMS P1 D1; ACMS P2 D1, ACMS P3 D1). The generation of hyperspectral digital images by means of ACMS (ACMS P1 D1; ACMS P2 D1, ACMS P3 D1) can be effected for example by a hyperspectral true-color scanner having the following properties:

Xenon light source
Conforming to ASTM/CIE/ISO color measurement standards
Geometry: 45°/0°
Measurement area: 80×220 mm
Spatial resolution: 125 µm
Spectral range: 380-780 nm
Spectral resolution: 5 nm On the basis of the hyperspectral digital image obtained it is possible to carry out a contrast assessment and a quality evaluation of multicolored surfaces. On the basis of a similarity comparison of the hyperspectral images (ACMS P1 D1; ACMS P2 D1, ACMS P3 D1), similarity factors are calculated for one or more color values of the decoration (D1). Said similarity factors can be exchanged as a standardized protocol between a customer (producer of the substrate material) and a supplier (producer of the decoration). However, creating a calibrated decoration by means of hyperspectral digital images according to ACMS (D1/ACMS D1) is expensive and time-consuming and unsuitable for the online quality control of production batches (Pn) of substrate materials of the decoration (Pn D1). According to this method, moreover, hyperspectral digital images of printed substrate materials in ongoing production (Pn D1/ACMS) would have to be continuously generated and processed by means of ACMS (Pn D1/ACMS Pn D1), in order to enable a comparison with the calibrated decoration on the basis of hyperspectral digital images (D1/ACMS D1).

Figure 2:
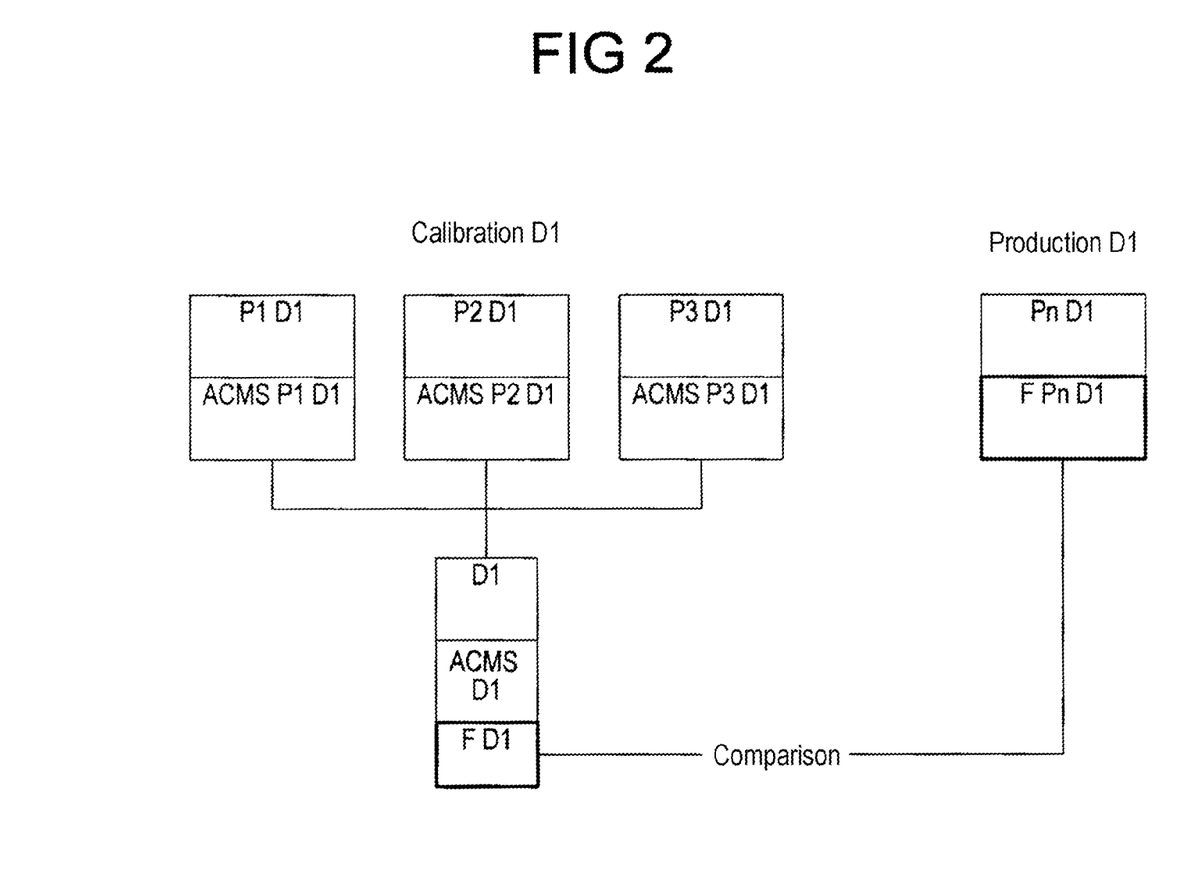
FIG. 2: shows the online online quality control of decorative prints on substrate materials according to the invention.

The method according to the invention, as illustrated in FIG. 2, is a development of the method according to FIG. 1. A plurality of decorative prints and the respective generation of a hyperspectral image by means of ACMS are effected in the calibration. Provided that the values obtained here correspond to the similarity stipulations, this decoration is released for further processing. The creation of the calibrated decoration on the basis of hyperspectral digital images (D1/ACMS D1) is followed by the generation of a digital target image (F D1) with lower resolution in the range of 4 to 36 megapixels. For the online quality control method according to the invention, this digital target image is stored in a database and used for a rapid comparison in any further production of this decoration. In the present case, the digital target image (F-D1) was generated as a digital photograph. Digital actual images (F Pn D1) are generated from the production batches (Pn D1) at continuous time intervals. The digital actual images are recorded in each case under approximately identical conditions, in a manner largely shielded from variable external light influences, such as, for example, by means of a tube which is open only toward the object and in which the recording device and an illumination system that may be needed are positioned. The digital actual images (F Pn D1) are continuously subjected to a similarity comparison vis-à-vis the digital target image (F-D1). In this case, for example, one or more color values of the L*a*b* color space and/or of the L*C*h° color space are determined and compared with one another. In the event of one or more color values of the digital actual images exceeding the predefined target value, which is 20%, for example, for the color values of the L*a*b* color space, it is possible to intervene in production and to influence the production process. This can be done manually. For this purpose, if corresponding deviations of color values occur, this is indicated to the operator of a production installation by means of a signal. This signal can be, for example, an acoustic signal or a visual signal in the form of signal luminaires or colored displays on the monitor of a process computer. A visual signal in the color green indicates for example that no color deviations have been measured between the digital target image and the digital actual image. A visual signal in the color yellow indicates color deviations. However, the latter vary within a predefined tolerance range or below a predefined target value and there is no need for any intervention in the position process. A visual signal in the color red indicates color deviations which vary outside a predefined tolerance range or above a predefined target value. Here it is necessary for the operator of the production installation to intervene in the production process. By way of example, said operator can stop ongoing production or correct the printing for individual or a plurality of color channels such that color deviations occur only within the predefined tolerance range or below a predefined target value. Alternatively, if color deviations have been ascertained, an automatic adaptation of the decorative print can be effected by means of a process computer and corresponding control software, such that color deviations no longer occur or they are kept small enough that the color deviations occur only within a permissible tolerance range or below a predefined target value.

Exemplary Embodiment 1—Analog Decoration Direct Printing

An HDF board (8 mm) coated with a basecoat containing titanium dioxide was decorated by means of indirect intaglio printing using a plurality of rollers. The decoration chosen was a wood decoration. A 3-ink system was employed here, with 3 roller application mechanisms, which successively apply different inks. The ink application rollers were correspondingly engraved, such that ink was taken up into the engraving, transferred to a rubber roller and then printed onto the substrate. After the production of the printed decoration, a digital photograph (actual image) was generated with a resolution of 12 megapixels by means of a digital camera. The color values of the L*a*b* color space of this actual image were compared with the color values of the L*a*b* color space of a digital target image. The digital target image had been produced by way of identical decoration calibrated beforehand by means of hyperspectral digital images (ACMS) and the generation of a digital photograph thereof with a resolution of 12 megapixels. This process was repeated for every tenth HDF board in each production batch. The digital actual images were recorded in each case under identical conditions by way of a tube which was open only toward the object and in which the digital camera and an illumination system were positioned. As a target value for allowed color deviations, 20% was defined for the individual values of the L*a*b* color space. Only deviations that were below the predefined target value were ascertained during the similarity comparison of the color values of the digital target image and the digital actual image. Intervention in the production process was therefore not necessary and subsequent substrate boards were printed with the same decoration using the same printing conditions.

Exemplary Embodiment 2—Digital Printing

A multiplicity of HDF boards (8 mm) coated with a basecoat containing titanium dioxide were printed with a wood decoration using a digital printer. The printer, which had four rows of print heads, printed with a modified color set (rY=reddish yellow, gY=greenish yellow, C=red and K=key or black). The inks were water-based. A digital photograph (actual image) of every tenth printed HDF board was generated with a resolution of 8 megapixels by means of a digital camera. The color values of the L*a*b* color space of said actual image were compared with the color values of the L*a*b* color space of a digital target image. The digital target image had been produced beforehand by calibration of hyperspectral digital images of the same decoration by means of ACMS and generation of a digital photograph thereof with a resolution of 8 megapixels. The digital actual images were recorded in each case under identical conditions by way of a tube which was open only toward the object and in which the digital camera and an illumination system were positioned. As a target value for allowed color deviations, 15% was defined for the individual values of the L*a*b* color space. During the similarity comparison of the color values of the digital target image and the digital actual image, deviations for the color values a* and b* of 17% and 20%, respectively, were ascertained in the digital actual images. The color deviations were communicated to the control computer of the printing line. With the aid of RIP software on the control computer, the digital printing was automatically adapted to the color values of the digital target image. After the adaptation of printing, a digital photograph (actual image) of every tenth printed HDF board was furthermore generated with a resolution of 8 megapixels by means of a digital camera. The renewed similarity comparison revealed that color deviations for all color values of the L*a*b* color space now occurred below the predefined target value of 15%.

Exemplary Embodiment 3—Finishing

The printed HDF boards in accordance with exemplary embodiments 1 and 2 are subjected to further processing as follows:

The printed HDF boards were separated upstream of the production line and transported through the following production installation at a rate of 28 m/min.

In a first roller application unit, approximately 70 g of liquid melamine resin (solids content: 55% by weight) comprising the conventional auxiliaries (hardeners, wetting agents, etc.) are applied to the board surface. A melamine resin is likewise applied to the board underside by the first roller application unit (quantity applied: 60 g of liquid resin/m$^2$, solids content: approximately 55% by weight).

A scattering apparatus is then used to scatter 14 g of corundum/m$^2$ (F 200) onto the surface. A distance of approximately 5 m before the dryer is reached allows the corundum to sink into the melamine resin. The board then passes through a convection dryer. A quantity of 25 g/m$^2$ of a melamine resin layer (solids content: 55% by weight) is then applied. Again, this comprises the conventional auxiliaries. A melamine resin is likewise applied to the board underside by a roller application unit (quantity applied: 50 g of liquid resin/m$^2$, solids content: approximately 55% by weight). Again, the board is dried in a convection dryer.

A melamine resin that additionally also comprises glass beads is then applied to the board surface. Said glass beads have a diameter of 60-80 μm. The applied quantity of the resin is approximately 20 g of liquid melamine resin/m$^2$ (solids content: 61.5% by weight). The formulation also comprises a release agent, alongside the curing agent and the wetting agent. The applied quantity of glass beads is approximately 3 g/m$^2$. A melamine resin is likewise applied to the board underside by a roller application unit (quantity applied: 40 g of liquid resin/m$^2$, solids content: approximately 55% by weight). Again, the board is dried in a convection dryer, and is then again coated with a melamine resin comprising glass beads. Cellulose (Vivapur 302) is included as a further component. Again, approximately 20 g of liquid melamine resin/m$^2$ (solids content: 61.6% by weight) are applied. Here again, approximately 3 g of glass beads and 0.25 g of cellulose/m$^2$ are applied. The formulations also comprise a release agent, alongside the curing agent and the wetting agent. A melamine resin is likewise applied to the board underside by a roller application unit (quantity applied: 30 g of liquid resin/m$^2$, solids content: approximately 55% by weight). Again, the resin is dried in a convection dryer, and then the board is pressed at 200° C. and a pressure of 400 N/cm$^2$ in a short-cycle press. The press time was 10 seconds. Structure was provided by using a press plate with a wood structure.

The invention claimed is:

1. A method for online quality control of decorative prints on substrates, comprising a similarity comparison of an actual image and a target image of print decors and an adjustment of the decorative print when deviations of color values of the actual image from color values of the target image are detected during production of a batch of substrates with a decorative layer, wherein the method comprises the steps of:

a) generating a plurality of hyperspectral digital images of a print décor formed on a like plurality of substrates;
b) calibrating the print decor by means of the plurality of hyperspectral digital images by generating from the plurality of generated hyperspectral digital images an average hyperspectral digital image of the print decor;
c) generating and storing a digital target image, in the form of a digital photograph, of the print decor by converting the average hyperspectral digital image of the print decor having a one resolution into an image having another, reduced resolution in the range of 4 to 36 megapixels;
d) printing at least one first print decor on at least one first substrate;
e) generating and storing at least one digital actual image, in the form of a digital photograph, of the printed decor on the at least one first substrate with a resolution in the range from 4 to 36 megapixels, by means of a color scanner or a digital camera;
f) determining of color deviations for one or more color values of the L*a*b* color space and/or the L*C*h° color space between the digital target image and the at least one digital actual image by a computer program; and
g) printing at least one side of further substrates while forming a decorative layer in such a way that color deviations between the digital target image and the at least one digital actual image of the printed decorations on the further substrates occur only below a predetermined nominal value or only within a predetermined tolerance range.

2. The method according to claim 1, wherein the generation of each hyperspectral digital image of the print decor is carried out by means of a hyperspectral scanner.

3. The method according to claim 1, wherein the digital target image is generated in method step c) by converting a calibrated hyperspectral image into the image with the reduced resolution in the range from 4 to 36 megapixels by means of a computer program or by printing the print decor on a substrate and subsequently scanning it by means of a color scanner or photographing the printed decor by means of a digital camera.

4. The method according to claim 1, wherein the generation of each digital image according to method steps c) and e) is carried out under equivalent conditions.

5. The method according to claim 1, wherein during the production of a batch of substrates with the formation of a decorative layer, the generation of the at least one digital actual image is carried out continuously and that the method steps f) and g) are repeated continuously.

6. The method according to claim 1, wherein the printing of the substrates according to method steps d) and/or g) is carried out by means of gravure printing or digital direct printing.

7. The method according to claim 1, wherein, if color deviations are detected in method step f),
a warning signal is issued to operators of a printing line for substrates, or
an automatic adjustment of one or more color values of the L*a*b* color space and/or the L*C*h° color space is carried out during the production of the print decor on the substrate in such a way that color deviations between the digital target image and the at least one digital actual image of the printed decor on further substrates occur only below a specified nominal value or only within a specified tolerance range.

8. The method according to claim 1, wherein the substrates are selected from a group comprising paper, glass, metal, foils, wood materials, in particular MDF or HDF boards, WPC boards, veneers, paint layers, plastic boards and inorganic carrier boards.

9. The method according to claim 1, wherein a print decor produced by means of digital printing or a print decor produced by means of gravure printing using printing rollers is printed on uniformly basecoated substrates.

10. The method according to claim 1, wherein a protective layer is applied to the print decor or the print decors.

11. The method according to claim 1, wherein at least one of the printed substrates, which may be provided with a protective layer, is fed to a short-cycle (SC) press for further processing.

12. A device, configured to carry out a process for online quality control of print decors on substrates according to claim 1, the device comprising:
at least one means for generating the plurality of hyperspectral digital images of a print decor;
at least one means for calibrating the print decor based on the average hyperspectral digital image generated from the plurality of hyperspectral digital images of the print decor;
at least one means for generating and storing the digital target image of the print decor with a reduced resolution in the range of 4 to 36 megapixels;
at least one means for printing the at least one first print decor on the at least one first substrate;
at least one color scanner or a digital camera for generating and storing the at least one digital actual image of the printed decor on the at least one first substrate with a resolution in the range of 4 to 36 megapixels;
at least one means for determining color deviations between the digital target image and the digital actual image in the L*a*b or L*C*h° color space; and
at least one means for adapting/controlling the decor printing when printing the at least one side of further substrates while forming the decorative layer in such a way that the color deviations in the L*a*b or L*C*h° color space between the digital target image and the digital actual image of the printed decors on the further substrates occur only below the predetermined nominal value.

13. The device according to claim 12, wherein the means for generating the plurality of hyperspectral digital images of the print decor is a hyperspectral scanner.

14. The device according to claim 12, further comprising at least one means for applying a protective layer to each substrate provided with the respective print decor.

15. The method of claim 1, wherein the image of method step c) having the reduced resolution in the range of 4 to 36 megapixels is an image in an L*a*b or L*C*h° color space.

* * * * *